United States Patent Office 3,817,821
Patented June 18, 1974

3,817,821
LAMINAR PACKAGING FILM
John B. Gallini, Richmond, Va., assignor to E. I. du Pont de Nemours and Company, Wilmington, Del.
Filed Nov. 8, 1972, Ser. No. 304,597
Int. Cl. B65d 65/40, 75/12; B32b 27/08
U.S. Cl. 161—165               5 Claims

ABSTRACT OF THE DISCLOSURE

A laminar, sealable, packaging material of at least three layers comprising a blend of ethylene/vinyl acetate copolymer with a second ethylene/vinyl acetate copolymer or polybutene-1; a high density polyethylene; and a blend of high density polyethylene and ethylene vinyl acetate, the layers being bonded together in the order specified. Also provided are packages prepared from the laminar structure.

BACKGROUND OF THE INVENTION

In the preparation of packaging films for foodstuffs, it is desirable to have a combination of barrier properties including resistance to moisture, gas, greases and oils to afford long term protection of the packaged foodstuff. A particularly satisfactory film product has been realized in the past through a laminar structure of polyethylene and an ethylene vinyl acetate copolymer. However, in addition to the basic requirement of protecting the packaged foodstuff, the film structure should be easily converted into a package that can be readily opened by the consumer. Snack food bags are often made by first forming a tube of a sheet of film by sealing together the edges of the film in an overlapping condition so that opposite surfaces of the film are sealed together at the seam. The bag can then be completed by sealing together the top and bottom, with the same film surfaces being sealed together.

A combination of properties in a snack food packaging material heretofore not fully realized is the ability to form strong heat seals with the opposite surface of the film as well as the ability to form peelable heat seals with the same surface of the film, so that the sealed package can be readily opened along the top or bottom seal while retaining a strong closure along the overlapped back of the package.

SUMMARY OF THE INVENTION

The present invention provides a unique laminar film structure which can form heat seals between the top and bottom surfaces having a seal strength in excess of 100 grams per inch while forming peelable seals between top surfaces of the laminar structure.

Specifically, the present invention provides a laminar structure having at least three layers and comprising a core consisting essentially of polyethylene having a density of about from 0.93 to 0.98; the core having bonded to a first surface thereof a layer having a thickness of not more than about 0.5 mil and comprising a blend of (a) about from 20 to 40 percent by weight of at least one polymer selected from polybutene-1 and ethylene/vinyl acetate copolymer having about from 35 to 70 percent vinyl acetate, and
(b) about from 80 to 60 percent of an ethylene/vinyl acetate copolymer consisting essentially of about from 5 to 28 percent vinyl acetate;

and a film having a thickness of about from 0.1 to 1.0 mil bonded to the second surface of the polyethylene core and comprising a polymer blend of (a) about from 60 to 90 percent polyethylene having a density of about from 0.93 to 0.98 and (b) about from 40 to 10 percent of at least one ethylene vinyl acetate copolymer having an average vinyl acetate content of about from 8 to 28 percent.

The invention further provides a package prepared from the above laminar structures, in which the laminar sheet is sealed in a tubular configuration by a seam in which the copolymer blend bonded to the first surface is sealed to the high density polyethylene blend layer bonded to the second surface and in which the ends of the package are sealed by a seam in which the copolymer blend layer is sealed to itself.

DETAILED DESCRIPTION OF THE INVENTION

Figure 1:
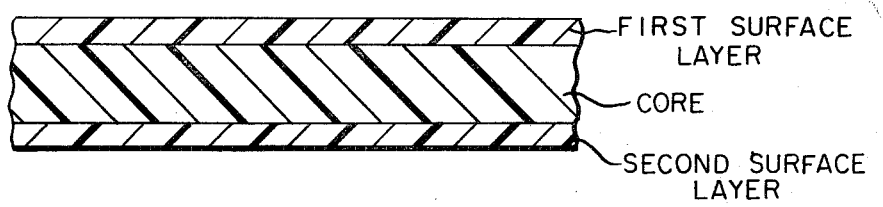
FIG. 1 is a cross-sectional illustration of a representative laminar structure of the present invention.

The present laminar structures are prepared using a core of high density polyethylene having a thickness of about from 1 to 5 mils. The density of the polyethylene, as indicated above, should be about from 0.93 to 0.98. The polyethylene core can optionally contain up to about 10 percent of various additives such as titanium dioxide pigment.

The components bonded to the polyethylene core should be of minimal thickness, since the primary purpose of these lamina is to modify the surface characteristics of the polyethylene. In general, the outer lamina should be less than 1.0 mil thick, and the ethylene vinyl acetate copolymer blend can be 0.5 mil or less.

The ethylene vinyl acetate blend can be prepared by conventional techniques, admixing the required quantities of the copolymers. In a particularly preferred embodiment, 70 weight percent of ethylene vinyl acetate having a melt index of 8 and containing 18 percent vinyl acetate is admixed with 27.5 weight percent of ethylene vinyl acetate having a melt index of 50 and comprising 40 percent vinyl acetate. Melt index can be measured according to conventional techniques such as ASTM-D-1238-65-T, condition E. To this is added 2.0 weight percent erucamide and 0.5 weight percent silica, which are incorporated to give improved slip properties. This polymer blend satisfactorily modifies the heat seal characteristics of the high density polyethylene when used as a layer having a thickness of about 0.2 mil. In addition to the erucamide and silica, various other conventional modifying agents can be added to the polymer blend, up to a total weight percent of about 5 percent.

When polybutene-1 is used instead of all or part of the high vinyl acetate component of the blend, it can be substituted in the above blending procedure. In general, about from 25 percent to 30 percent of a polybutene-1, based on the total weight of the layer bonded to the first surface of the core, will reduce the heat seal strength of that layer to itself, providing a package which can be pulled open by the user. The polybutene-1 should, of course, be of film-forming molecular weight, and can be obtained through commercially available sources or prepared as described in U.S. Pat. 3,362,940.

The layer bonded to the second surface of the polyethylene core can be similarly blended and can, in addition to the required polymers, comprise up to about 10 weight percent of additives such as erucamide and pigments. It has been found especially convenient to use, in the formulation of this polymer blend, recycled laminate of the present invention. Accordingly, a polyethylene-ethylene vinyl acetate blend comprising 82 percent high density polyethylene, 13 percent ethylene vinyl acetate, 4⅓ percent titanium dioxide and ⅔ percent erucamide can be prepared using approximately 95 percent reclaimed laminate, containing both ethylene/vinyl acetate copolymers and high density polyethylene together with 4.75 percent ethylene vinyl acetate containing 18 percent vinyl acetate and 0.25 percent erucamide, which is added to improve slip characteristics. As will be evident to those skilled in the art, when polybutene-1 is used as a component of the blend bonded to the first surface, and when recycled laminate is used for the layer bonded to the second surface, then a corresponding quantity of polybutene-1 will be present in this second coating.

The present laminar film structures can be assembled by any suitable means such as heat lamination of preformed films after suitable adhesion promoting pretreatment. However, it has been found especially convenient to prepare the present laminates using a coextrusion process, particularly since at least one of the outer layers can have, and preferably does have, an especially low thickness of about 0.2 mil. Coextrusion techniques that can be used for the preparation of the instant laminates include those described in detail in U.S. Pat. 3,480,998.

The laminates of the present invention provide a combination of sealing characteristics that uniquely satisfy the packaging requirements encountered in the snack food industry. Specifically, a side seal for a bag between one side of the composite and the opposite side produces a strong heat seal substantially in exces of 100 grams per inch. At the same time, a crimped jaw seal between one side of the film and itself, specifically, the blend of ethylene vinyl acetate copolymers, provides a controlled crimped seal having a strength of greater than 100 grams per inch but less than 1,000 grams per inch. Moreover, the sealing properties are obtained without sacrificing the moisture permeability of the packaging material.

Figure 2:
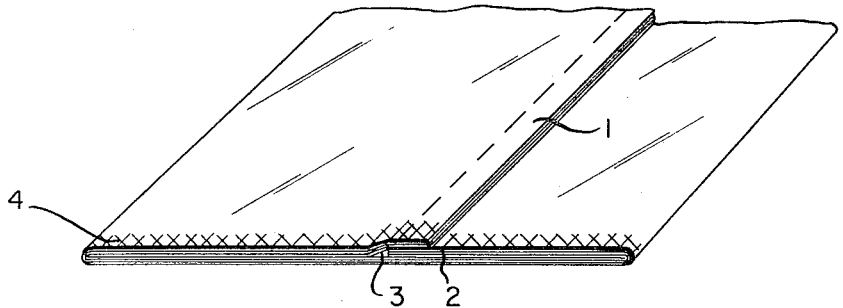
FIG. 2 is an illustration of a representative package that can be made using the laminar structure of the invention.

The present laminates are particularly well suited for use in conventional vertical make-and-fill machines in which a bag is continuously made from film, filled and subsequently sealed. FIG. 2 is a perspective view of one end of such a bag. In that figure, a seal 1 is prepared by heat sealing together the front surface 2 of the laminate with the back surface 3 when in an overlapped configuration. The top and bottom of the bag are then closed by sealing together similar inside surfaces in shaded area 4.

I claim:

1. A laminar structure having three layers and comprising a core consisting essentially of polyethylene having a density of about from 0.93 to 0.98; the core having bonded to a first surface thereof a layer having a thickness of not more than about 0.5 mil and consisting essentially of a blend of
   (a) about from 20 to 40 percent by weight of at least one polymer selected from polybutene-1 and ethylene/vinyl acetate copolymer having about from 35 to 70 percent vinyl acetate, and
   (b) about from 80 to 60 percent of an ethylene/vinyl acetate copolymer consisting essentially of about from 5 to 28 percent vinyl acetate;

and a film having a thickness of about from 0.1 to 1.0 mil bonded to the second surface of the polyethylene core and consisting essentially of a polymer blend of
   (a) about from 60 to 90 percent polyethylene having a density of about from 0.93 to 0.98, and
   (b) about from 40 to 10 percent of at least one ethylene vinyl acetate copolymer having an average vinyl acetate content of about from 8 to 28 percent.

2. A laminate of claim 1 wherein the polymer blend bonded to the first surface of the core comprises (a) about 70 weight percent of ethylene/vinyl acetate having a melt index of 8 and containing 18 percent vinyl acetate, (b) about 27.5 weight percent of polybutene-1 of film-forming molecular weight, and (c) about 2.5 weight percent of modifying additives.

3. A laminate of claim 1 wherein the polymer blend bonded to the first surface of the core comprises (a) about 70 weight percent of ethylene/vinyl acetate having a melt index of 8 and containing 18 percent vinyl acetate, (b) about 27.5 weight percent of ethylene/vinyl acetate having a melt index of about 50 and comprising about 40 percent vinyl acetate, and (c) about 2.5 weight percent of modifying additives.

4. A laminate of claim 1 wherein the blend of polyethylene and ethylene vinyl acetate bonded to the second surface of the core comprises (a) about 82 percent polyethylene, (b) about 13 percent ethylene-vinyl acetate copolymer blend, and (c) about 5 percent modifying additives.

5. A laminate of claim 1 having been prepared by coextrusion of the layers.

References Cited

UNITED STATES PATENTS

| | | | |
|---|---|---|---|
| 3,433,573 | 3/1969 | Holladay et al. | 260—897 B |
| 3,436,246 | 4/1969 | Williams, Jr., et al. | 117—68.5 |
| 3,467,296 | 9/1969 | Anderson et al. | 117—68.5 |
| 3,532,536 | 10/1970 | Le Roy Noyes et al. | 117—68.5 |
| 3,539,439 | 11/1970 | Calderwood et al. | 117—138.8 E |
| 3,625,727 | 12/1971 | Lightfoot et al. | 117—161 UC |
| 3,647,485 | 3/1972 | Seiferth et al. | 161—252 |
| 3,741,253 | 6/1973 | Brax et al. | 161—254 |

GEORGE F. LESMES, Primary Examiner

C. E. LIPSEY, Assistant Examiner

U.S. Cl. X.R.

117—68.5, 122 H, 138.8 E, 161 UC; 161—252, 254, 410; 260—897 B; 426—127